United States Patent Office 2,984,273
Patented May 16, 1961

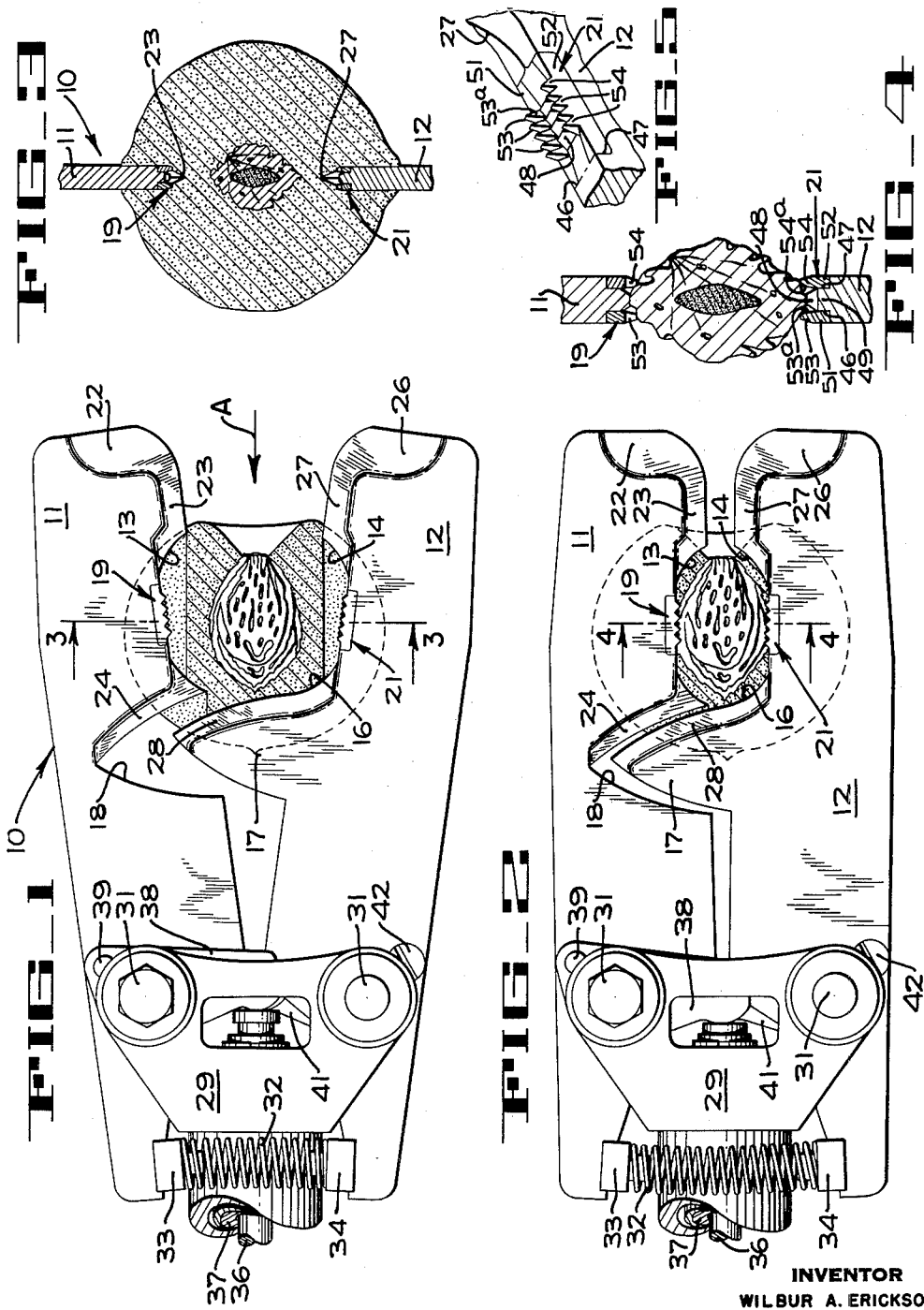

2,984,273

FRUIT PROCESSING APPARATUS

Wilbur A. Erickson, San Jose, Calif., assignor to Food Machinery and Chemical Corporation, San Jose, Calif., a corporation of Delaware Filed Feb. 2, 1959, Ser. No. 790,591

3 Claims. (Cl. 146—28)

The present invention appertains to fruit processing apparatus and more particularly relates to a pitting apparatus having means for cutting the meat and gripping the pit of a fruit, such as a peach.

In one method of pitting peaches, two aligned blades are forced into each peach from opposite sides of the peach along the suture plane. The blades bisect the meat of the peach and come into firm gripping engagement with opposite sides of the pit. While the pit is held by the blades, the peaches halves are twisted to separate the peach halves from the pit. Peach pits are relatively brittle and there is a considerable tendency for the pits to split in halves along the suture plane during the twisting operation. This tendency to split is aggravated by a gripping pressure on the pit which is directed against the opposite edges of the pit along its suture plane. Accordingly, considerable difficulty has been experienced in obtaining pit gripping blades that are capable of applying adequate gripping pressure to a peach pit to hold it in fixed position without fracturing it.

It is, therefore, one object of the present invention to provide an improved fruit processing apparatus.

Another object is to provide an improved apparatus for bisecting the meat of a peach and gripping the pit.

Another object is to provide an improved pit-gripping blade.

These and other obects and advantages of the present invention will become apparent from the following description and the accompanying drawings, in which:

Fig. 1 is a side elevation of the fruit cutting and pit-gripping apparatus of the present invention, said apparatus being shown in an open peach receiving position, with a peach, shown in section, impaled on the blades of the apparatus.

Fig. 2 is a side elevation similar to Fig. 1 but showing the fruit cutting and pit-gripping apparatus in a closed, pit-gripping position.

Fig. 3 is a section taken along lines 3—3 of Fig. 1.

Fig. 4 is an enlarged section taken along lines 4—4 of Fig. 2.

Fig. 5 is an enlarged perspective of the pit-gripping portion of one of the blades.

The fruit cutting and pit-gripping apparatus 10 (Figs. 1 and 2) of the present invention comprises a pair of blades 11 and 12 having concave recesses 13 and 14, respectively, which cooperate to define a pit receiving opening 16. The blade 12 has a raised V-shaped part 17 which enters a V-shaped cut-away portion or opening 18 in the blade 11 when the blades are moved into a closed position. Within the recesses 13 and 14 are mounted pit-gripping jaws 19 and 21, respectively, which cooperate to grip the pit when the blades 11 and 12 are closed. The blade 11 has a sharpened forward edge 22, a sharpened intermediate edge 23 between the edge 22 and the jaw 19, and a sharpened rear edge 24 between the jaw 19 and the apex of the V-shaped opening 18. Similarly, the blade 12 has a sharpened forward edge 26, a sharpened intermediate edge 27 between the edge 26 and the jaw 21, and a sharpened rear edge 28 which extends between the jaw 21 and the apex of the V-shaped part 17.

The blades 11 and 12 lie in the same plane and each blade is pivotally connected to a support member 29 by a bolt 31. A pair of compression springs 32, one only being shown, are disposed between ears 33 and 34 that are secured to the rear end portions of the blades 11 and 12, respectively. The springs 32 urge the blades into pit-gripping engagement as shown in Fig. 2. The blades 11 and 12 are moved to the open position by a rod 36 which is slidably supported in a tubular support 37. The rod 36 bears against a lever arm 38 which is rigidly secured to the blade 11 by a capscrew 39, and against a lever 41 which is secured to the blade 12 by a capscrew 42. The rod 36 is arranged to be reciprocated by any suitable means, such as by a cam (not shown) on the associated fruit processing machine, to control the opening and closing of the blades 11 and 12.

The pit-gripping jaws 19 and 21 are identical but are facing in opposite directions. It is believed that the description of the jaw 21 (Figs. 4 and 5) will suffice to disclose the construction and operation of jaw 19 also. Recesses 46 and 47 are ground or otherwise formed on opposite sides of the blade 12, leaving a center strip 49 on which an intermediate row of teeth 48 are ground. Toothed inserts 51 and 52 are welded or brazed in the depressions 46 and 47 respectively with their outer side surfaces in the same plane as the corresponding surfaces of the blade 12. The teeth 53 and 54 of the inserts 51 and 52, respectively, extend further into the pit receiving opening 16 (Fig. 2) than the intermediate row of teeth 48, as clearly shown in Fig. 4. Thus, each jaw is formed by two outer rows of teeth 53 and 54 and an intermediate row of teeth 48, all of which cooperate to grip the pit and prevent the pit from rotating in the plane of the blades 11 and 12 while the peach halves are twisted from the pit. The outer rows of teeth 53 and 54 of each jaw 19 and 21 contact the pit adjacent to but on the opposite sides of the suture plane and have inner surfaces 53a and 54a (Fig. 4) which are beveled so as to exert a force on the pit which tends to urge the pit halves firmly together at their suture plane. This action of the jaws is particularly effective in preventing the splitting of the pit along this plane. The intermediate row of teeth 48 are staggered relative to the outer rows of teeth 53 to provide more effective pit-gripping characteristics.

In the operation of the fruit cutting and pit-gripping apparatus 10 (Figs. 1 and 2) of the present invention, a peach to be halved and pitted is first disposed with the suture plane of the peach aligned with the plane of the blades 11 and 12. Then the peach is moved in the direction of the arrow A into the position shown in Fig. 1. During this movement, the sharpened edges 22, 23, 24, 26, 27 and 28 cut through a part of the meat of the peach. The rod 36 is then moved to the left (Fig. 2) allowing the springs 32 to pivot the blades 11 and 12 to the position shown in Figs. 2 and 4, thereby severing substantially all the peach meat and firmly clamping the three rows of teeth 48, 53 and 54 of each of the jaws 19 and 21 against the pit. The sloping inner surfaces of the teeth 53 and 54 contact the pit on opposite sides of the suture plane and urge the opposite sides of the pit toward each other to prevent splitting of the same along the suture plane. With the pit firmly gripped as above described, the two halves of the peach are twisted free from the pit by means not shown.

From the foregoing description it will be seen that the fruit cutting and pit-gripping apparatus of the present invention provides a particularly effective means for holding the pit of a peach while the opposite halves are twisted free from the pit. The use of two outer rows of teeth which project further toward the pit than the inner row of teeth and have beveled inside surfaces makes possible efficient pit-gripping with a minimum amount of pit cracking and breaking.

While one embodiment of the present invention has been shown and described, it will be understood that various changes and modifications may be made without departing from the spirit of the invention or the scope of the appended claims.

Having thus described the present invention, what is claimed as new and desired to be protected by Letters Patent is.

1. A fruit cutting and pit-gripping apparatus comprising a pair of sharpened blades mounted for pivotal movement between an open and a closed position, each of said blades having a recess, the recess of one blade cooperating with the recess of the other to define a pit receiving opening, three parallel rows of teeth secured to each blade with the outer rows of teeth projecting into said pit receiving opening farther than the intermediate row projects into said opening, said outer rows of teeth of each blade being arranged to contact the pit on opposite sides of the suture plane to prevent splitting of the pit along the suture plane, and means connected to said blades for moving the same to a closed pit-gripping position, said outer rows of teeth having their outer surfaces flush with the associated side surfaces of their associated blades.

2. A fruit cutting and pit-gripping apparatus comprising a pair of sharpened blades mounted for pivotal movement between an open and a closed position, each of said blades having a recess, the recess of one blade cooperating with the recess of the other to define a pit receiving opening, three parallel rows of teeth secured to each blade with the outer rows of teeth of each blade projecting into said pit receiving opening farther than the intermediate rows projects into said opening, said outer rows of teeth having their adjacent inner surfaces beveled toward the intermediate rows of teeth, said outer rows of teeth being arranged to contact the pit on opposite sides of its suture plane and the beveled inner surfaces being arranged to exert forces on the pit directed generally normal to the suture plane thereof to prevent splitting of the pit along the suture plane, and means connected to said blades for moving the same to a closed pit-gripping position, said outer rows of teeth having their outer surfaces flush with the associated side surfaces of their associated blades.

3. A fruit cutting and pit-gripping apparatus comprising a pair of sharpened blades disposed in a common plane and mounted for pivotal movement between an open and a closed position, each of said blades having a recess, the recess of one blade cooperating with the recess of the other to define a pit receiving opening, one of said blades having a cut-away portion, a raised portion on said other blade arranged to move into said cut-away portion when said blades are moved to the closed position, three rows of teeth secured to each of said blades in parallel relation with the associated blade, said rows of teeth being disposed within the side planes of said blade and the teeth of the intermediate row of teeth being staggered relative to the teeth of the adjacent outer rows, said outer rows of teeth projecting farther into the pit receiving opening than said intermediate rows and having their adjacent intermediate surfaces beveled toward the inner rows of teeth, said outer rows of teeth being arranged to contact the pit on opposite sides of its suture plane and the beveled inner surfaces being arranged to exert forces on the pit directed generally normal to the suture plane thereof to prevent splittting of the pit along the suture plane, and means connected to said blades for moving the same to a closed pit-gripping position.

References Cited in the file of this patent

UNITED STATES PATENTS

| | | |
|---|---|---|
| 2,392,451 | Barrows | Jan. 8, 1946 |
| 2,826,227 | Perrelli et al. | Mar. 11, 1958 |
| 2,826,228 | Perrelli et al. | Mar. 11, 1958 |